(12) United States Patent
Vyncke et al.

(10) Patent No.: US 10,272,905 B2
(45) Date of Patent: Apr. 30, 2019

(54) TRANSMISSION WITH INTEGRATED ELECTROMAGNETIC TORQUE CONVERTER

(71) Applicant: DANA BELGIUM N.V., Bruges (BE)

(72) Inventors: Thomas J. Vyncke, Deinze (BE); Mark R. J. Versteyhe, Oostkamp (BE)

(73) Assignee: Dana Belgium N.V., Bruges (BE)

( * ) Notice: Subject to any disclaimer, the term of this patent is extended or adjusted under 35 U.S.C. 154(b) by 210 days.

(21) Appl. No.: 14/999,975

(22) PCT Filed: Jan. 29, 2015

(86) PCT No.: PCT/EP2015/051859
§ 371 (c)(1),
(2) Date: Jul. 21, 2016

(87) PCT Pub. No.: WO2015/114064
PCT Pub. Date: Aug. 6, 2015

(65) Prior Publication Data
US 2017/0001629 A1    Jan. 5, 2017

Related U.S. Application Data

(60) Provisional application No. 61/933,074, filed on Jan. 29, 2014.

(51) Int. Cl.
*B60K 6/48*     (2007.10)
*B60W 20/30*    (2016.01)
(Continued)

(52) U.S. Cl.
CPC .............. *B60W 20/30* (2013.01); *B60K 6/26* (2013.01); *B60K 6/36* (2013.01); *B60K 6/448* (2013.01);
(Continued)

(58) Field of Classification Search
CPC .................... B60K 6/48; B60K 2006/4825
(Continued)

(56) References Cited

U.S. PATENT DOCUMENTS 2,465,006 A    3/1949  Bowes et al.
2,864,016 A   12/1958  Waltscheff
(Continued)

FOREIGN PATENT DOCUMENTS

CN    1572052 A    1/2005
CN  101056775 A   10/2007
(Continued)

OTHER PUBLICATIONS

European Patent Office, International Search Report and Written Opinion of PCT/EP2015/051859, dated Jun. 15, 2015, 10 pages, European Patent Office, Rijwijk, The Netherlands.
(Continued)

*Primary Examiner* — Ha Dinh Ho
(74) *Attorney, Agent, or Firm* — Marshall & Melhorn, LLC

(57) ABSTRACT

The inventors' findings relate to a transmission for vehicles, comprising an input side configured for being coupled to a prime mover and an output side configured for being coupled to a driven element wherein the transmission comprises an electromagnetic torque converter (EMTC), wherein the EMTC has at least two output paths, namely the first output path coupled to a gear box which is preferably configured for being coupled to a drive shaft of the vehicle, and a second output path which is configured to be coupled to an auxiliary power provider. The inventors' findings also relate to a vehicle driveline comprising said transmission. Furthermore, the inventors' findings also relate to a vehicle comprising said vehicle driveline.

15 Claims, 14 Drawing Sheets

(51) Int. Cl.
| | |
|---|---|
| *B60K 6/26* | (2007.10) |
| *B60K 6/448* | (2007.10) |
| *B60K 6/547* | (2007.10) |
| *H02K 51/00* | (2006.01) |
| *B60K 25/00* | (2006.01) |
| *B60K 25/02* | (2006.01) |
| *B60K 6/36* | (2007.10) |
| *B60K 6/543* | (2007.10) |
| *B60W 10/06* | (2006.01) |
| *B60W 10/10* | (2012.01) |
| *F16H 3/08* | (2006.01) |
| *F16H 37/02* | (2006.01) |
| *H02K 49/00* | (2006.01) |

(52) U.S. Cl.
CPC ............ *B60K 6/543* (2013.01); *B60K 6/547* (2013.01); *B60K 25/00* (2013.01); *B60K 25/02* (2013.01); *B60W 10/06* (2013.01); *B60W 10/10* (2013.01); *F16H 3/08* (2013.01); *F16H 37/02* (2013.01); *H02K 49/00* (2013.01); *H02K 51/00* (2013.01); *B60K 2006/262* (2013.01); *B60K 2006/266* (2013.01); *B60K 2025/005* (2013.01); *B60K 2025/022* (2013.01); *B60K 2025/026* (2013.01); *B60W 2710/1005* (2013.01); *B60W 2710/105* (2013.01); *B60Y 2200/92* (2013.01); *B60Y 2400/72* (2013.01); *Y02T 10/6243* (2013.01)

(58) Field of Classification Search
USPC .................. 74/661, 665 L, 665 G; 180/65.25
See application file for complete search history.

(56) References Cited

U.S. PATENT DOCUMENTS

| | | | |
|---|---|---|---|
| 7,164,219 B2 | 1/2007 | Hoeijmakers | |
| 7,204,776 B2* | 4/2007 | Minagawa | B60K 1/02 475/5 |
| 8,480,522 B2* | 7/2013 | Akutsu | B60K 6/26 180/65.225 |
| 8,653,677 B2 | 2/2014 | West | |
| 8,733,480 B2 | 5/2014 | Watanabe et al. | |
| 8,914,179 B2 | 12/2014 | Tsuchiya et al. | |
| 9,067,493 B2* | 6/2015 | Husson | B60K 6/46 |
| 2004/0124021 A1* | 7/2004 | Shirai | B60K 6/365 180/65.25 |
| 2007/0187159 A1* | 8/2007 | Lee | B60K 6/365 180/65.25 |
| 2011/0109179 A1* | 5/2011 | Akutsu | B60W 10/04 310/77 |
| 2012/0179320 A1* | 7/2012 | Abe | B60K 6/26 701/22 |
| 2014/0197716 A1 | 7/2014 | Shiina et al. | |
| 2014/0232228 A1 | 8/2014 | Watanabe et al. | |

FOREIGN PATENT DOCUMENTS

| | | |
|---|---|---|
| CN | 101778728 A | 7/2010 |
| CN | 103459179 A | 12/2013 |
| DE | 10012494 A1 | 9/2001 |
| EP | 2179879 A1 | 4/2010 |
| JP | 2001136606 A | 5/2001 |
| JP | 2014000871 A | 1/2014 |
| WO | 03/075437 A1 | 9/2003 |
| WO | 2012133905 A1 | 10/2012 |
| WO | 2013038845 A1 | 3/2013 |

OTHER PUBLICATIONS

Martin J. Hoeijmakers et al, The Electrical Variable Transmission, Industry Applications Conference, 2004, 29th IAS Annual Meeting, Oct. 3-7, 2004, pp. 2770-2777, Conference Record-of the 2004 IEEE Seattle, WA, USA, XP010735385.

Martin J. Hoeijmakers and Jan A. Ferreira, The Electric Variable Transmission, IEEE Transactions on Industry Applications, vol. 42, No. 4, Jul./Aug. 2006, pp. 1092-1100.

Longya Xu, Dual-Mechanical-Port Electric Machines, IEEE Industry Applications Magazine, Jul./Aug. 2009, pp. 44-51.

* cited by examiner

TRANSMISSION WITH INTEGRATED ELECTROMAGNETIC TORQUE CONVERTER

INTRODUCTION

The present patent application relates to a transmission with integrated electromagnetic torque converter, a driveline comprising such a transmission as well as a vehicle comprising such a driveline.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

The inventors' findings generally relate to vehicle drivetrains, for example, those in off-highway material handling and construction equipment, busses or passenger cars. In particular, the it relates to a transmission between a prime mover (typically but not limited to an internal combustion engine) and a plurality of driven elements (such as, but not limited to a plurality of vehicle wheels, a final drive or a differential).

The main function of the transmission is to match the speed of the plurality of driven elements and the prime mover and to facilitate operation of the prime mover at its optimal operating point. Furthermore, the transmission should allow the vehicle to start moving from a stand still. To this end, a torque transmitting coupling device is used, which is typically a clutch or a hydraulic torque converter. Especially in automatic transmissions, a hydraulic torque converter often is used to connect the prime mover to a gearbox (which typically comprises a plurality of gears and clutches or synchronizers). The main advantages of the hydraulic torque converter are the damping of vibrations from the prime mover and a torque multiplication inherent to its operation.

The main disadvantages of hydraulic torque converters are however a low efficiency at a wide range of operating points and a cooling system, which is necessary for proper operation. To address these disadvantages, the inventors' findings comprise of a new electromagnetic drivetrain solution which offers unique advantages over existing drivetrain technologies:

The current off-highway drivetrain technologies may be divided into three main groups:
  Hydrodynamic (HD) drivetrains, which typically comprise a hydraulic torque converter and a stepped gearbox
  Hydrostatic (HS) drivetrains, which typically comprise a hydraulic CVT (formed of a pump and motor in series) and a stepped gearbox or dropbox
  Diesel-electric-electric (DEE) drivetrains, which typically comprise an electric CVT (formed of a generator and a motor in series) and a dropbox Due to the use of the torque converter, hydrodynamic drivetrains are relatively simple in terms of construction and as such very robust and inexpensive. Due to the high power density of the hydraulic torque converter, the installation volume is relatively small. A main drawback of the hydrodynamic drivetrain is a comparatively low efficiency over a wide range of operating points. As a result, fuel consumption of hydrodynamic drivelines is comparatively high, which is no longer acceptable in the market. Furthermore, the hydrodynamic driveline generally requires a large cooling system to remove heat that is generated in the torque converter, as a significant part of the power transferred therethrough is lost.

Hydrostatic transmissions typically have a higher fuel efficiency and offer increased operator comfort (through the use of the CVT), this offering advantages over hydrodynamic transmissions. However, the main drawback of hydrostatic transmissions and related power-split derivatives is cost, in both initial acquisition as well as higher maintenance costs due to the complex hydraulic drive system which includes filters and pumps.

The diesel-electric-electric drivetrain and other series-electric drivetrain solutions have important advantages as well. These drivetrains are very efficient, allow for low vehicle emissions, and need little maintenance. Furthermore, they offer a high comfort and controllability and a flexible installation. Finally, they offer a possibility to have a series hybrid drivetrain in instances where electrical storage is added. The main drawbacks of electric drivetrains, however, are cost and installation space. Electric series hybrids often are currently too expensive and bulky to be a competitive alternative. The same is true for a series DEE driveline without storage due to the fundamentals of the technology, as all mechanical power is transferred to electrical power, which subsequently flows through a generator, a pair of inverters and a motor. As such, all components in the drivetrain (a generator, a motor, and power electronics) need to be rated at full power resulting in increased costs and volume. Further, overall energy losses are still quite considerable.

SUMMARY OF INVENTORS' FINDINGS

The subject-matter of the pending claims is, inter alia, related to a transmission with an integrated EMTC.

BRIEF DESCRIPTION OF THE DRAWINGS

The following non-limiting examples are shown in the following figures:

FIG. 2A, 2C, 2D show arrangements with concentric rotors, while 2B shows an arrangement with an intermediate rotating stator that is magnetically coupled to the primary rotor and mechanically to the secondary rotor.

GENERAL ASPECTS RELATING TO THE CLAIMS

The inventors' findings are focused on a transmission for vehicles, on a vehicle driveline comprising such a transmission in accordance with at least one of the claims, preferably claims 1-14. Moreover, the inventors' findings are related to a vehicle comprising a driveline according to one of the claims 1-14.

The transmission for vehicles comprises an input side configured for being coupled to a prime mover and an output side configured for being coupled to a driven element wherein the transmission comprises an electromagnetic torque converter (EMTC), characterized in that the EMTC has at least two output paths, namely a first output path coupled to a gearbox which is preferably configured for being coupled to a drive shaft of the vehicle, and a second output path which is configured to be coupled to an auxiliary power provider.

There are several embodiments of the transmission for vehicles according to the inventor's findings disclosed in this patent application.

Figure 1:
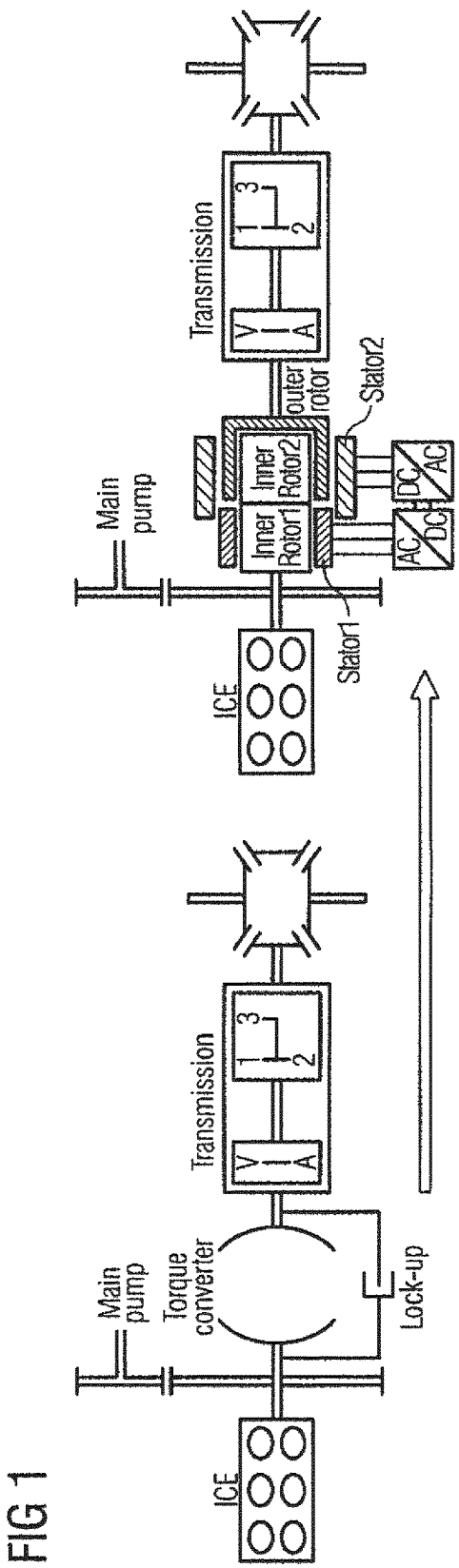
FIG. 1 relates to drivelines in which an internal combustion engine (ICE) is shown on the left hand side and a differential is shown on the right hand side.
Figure 3:
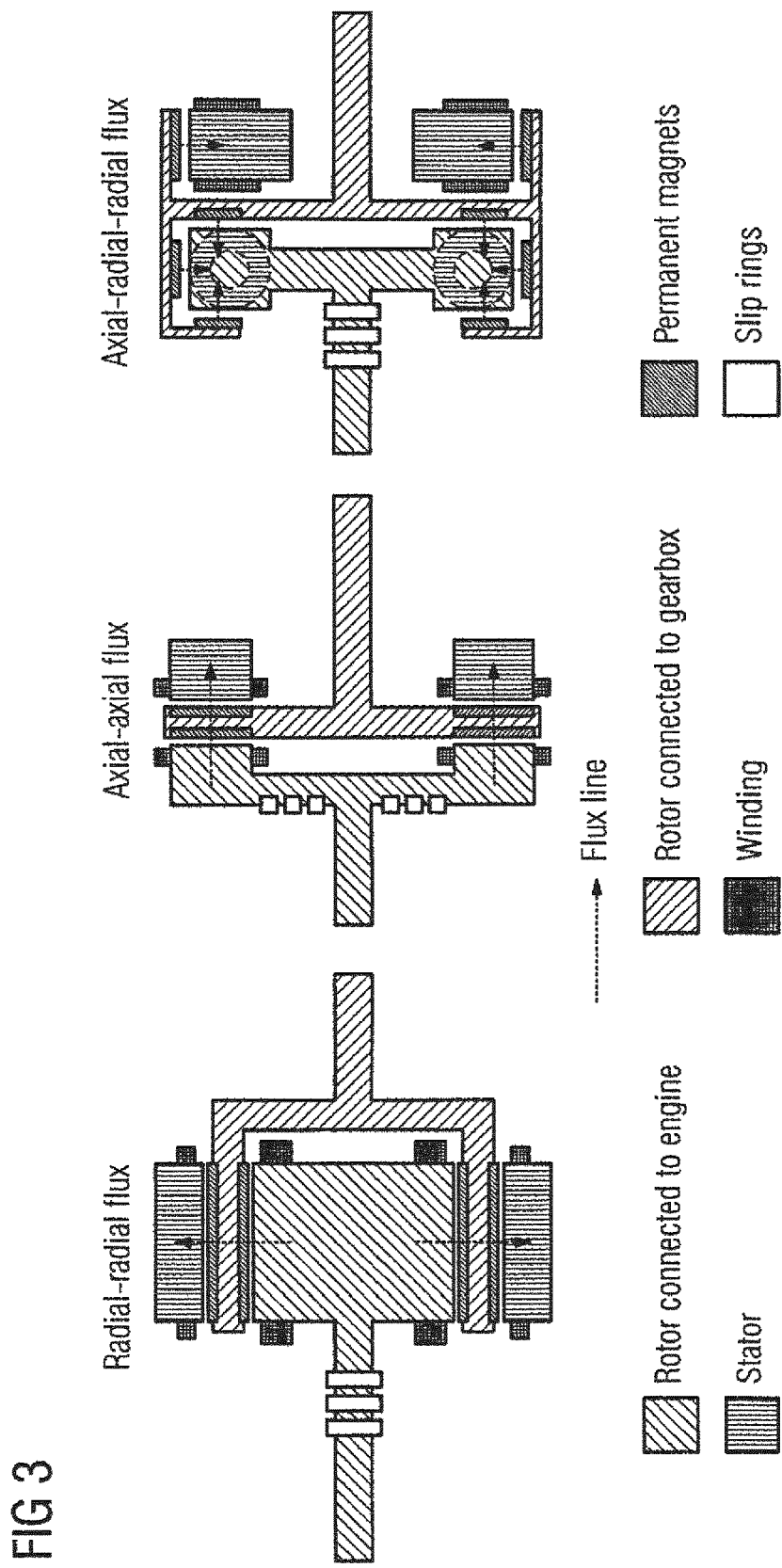
FIG. 3 relates to arrangements with different travelling directions for the flux lines. The dual concept of a machine with radial flux and concentric rotors is an axial flux machine with multiple aligned rotors.
Figure 4:
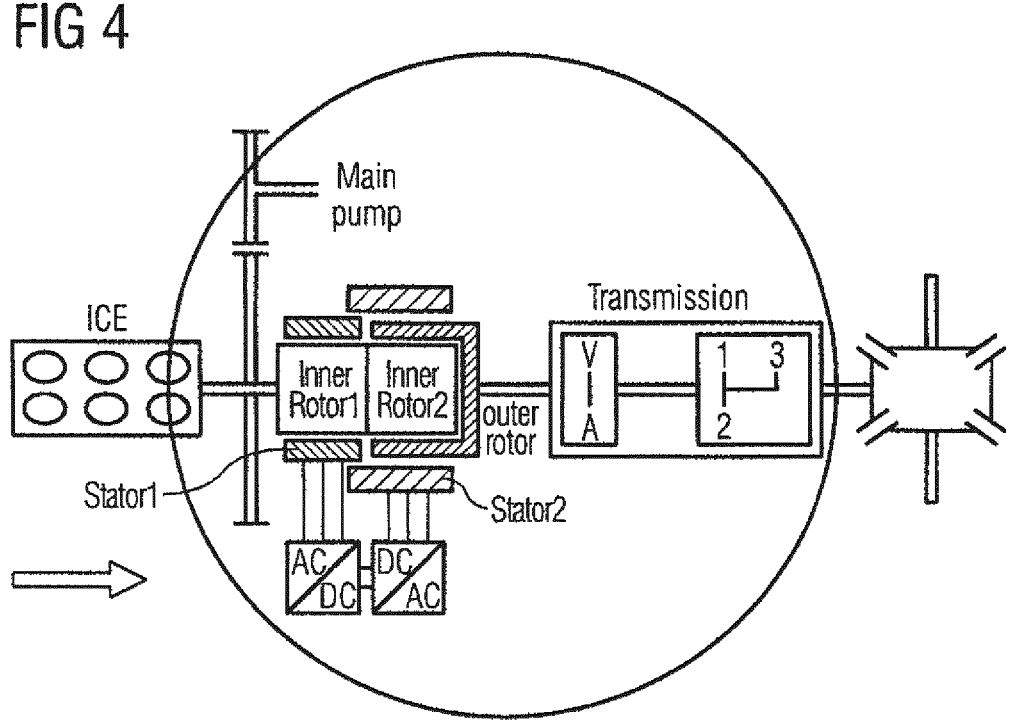
FIG. 4 relates to a driveline comprising an EMTC (see also FIG. 1, alternative on the right.)

In principle, FIG. 1 on the right (see also FIG. 4) shows the principal arrangement of a driveline/vehicle in which the transmission including the EMTC can be used. FIGS. 2A-2D show different EMTC alternatives; FIG. 3 shows different rotor/stator arrangements. All these details of the EMTC itself are part of the inventors' findings.

Moreover, the EMTC is integrated into the transmission, as shown in various embodiments below, especially in FIGS. 5A and 5B, FIGS. 7A-B, and FIG. 8A-B.

In the following, several exemplary embodiments are discussed. It is to be noted that any of the embodiments may be combined with another if nothing else is otherwise clearly stated. It is also to be noted that the transmission including the EMTC can be part of any driveline, especially according to the general principle as shown in FIG. 1.

According to an embodiment, the prime mover is in internal combustion engine (ICE), an electric motor, and/or a turbine.

According to one embodiment, the driven element is a drive shaft, a differential, a transfer case, and/or a disconnect system of a vehicle driveline.

According to an embodiment, a gearbox is a stepped gearbox, a CVT, and/or a combination of a CVT with a stepped gearbox.

According to an embodiment, the auxiliary power provider is a PTO (power trade-off) generator, a charge pump for the operation of the gearbox, a charge pump for work hydraulics and/or any other vehicle subsystem.

According to an embodiment, the EMTC has a first output shaft and a second output shaft, wherein these output shafts are connected to rotors that are either concentrically aligned (see FIG. 2A below) or in line (see FIG. 2B below).

According to an embodiment, the transmission comprises an electric controller to set the speeds of the shaft on the input side and on the output side in order to achieve an optimal performance of the transmission, for instance by providing an operation at the optimal internal combustion engine operating point, and/or to provide a maximal torque at the output side.

According to an embodiment, the EMTC is directly used as a generator for any vehicle subsystem or load by providing a connection point on the link from the electrical connection 1 to the electrical connection 2. (For details, see FIGS. 5A, 5B, 7A-B, 8A-B.)

According to an embodiment, the EMTC is coupled to an energy storage. For instance, a DC/DC-converter is placed on links EC1 and EC2 such that an electrical storage unit such as supercaps or a battery is added.

According to an embodiment, the EMTC has a radial-radial flux arrangement, an axial-axial flux arrangement, and/or an axial/radial-radial flux arrangement, as shown in FIG. 3 below.

According to an embodiment, the EMTC is not designed as a total transmission replacement but as a replacement for the hydraulic torque converter, the hydrostatic converter and/or series electrical converter. The EMTC may be integrated into the same housing as the rest of the transmission/gearbox.

According to an embodiment, the EMTC is integrated with the transmission's gearbox and comprises a DMPM with at least two mechanically or magnetically connected rotors, having two electrical ports that supply one of the rotors either via slip rings and/or via rotating contactless transfer and the fixed stator; see, for instance, FIGS. 5A, 5B below.

Figure 7A:
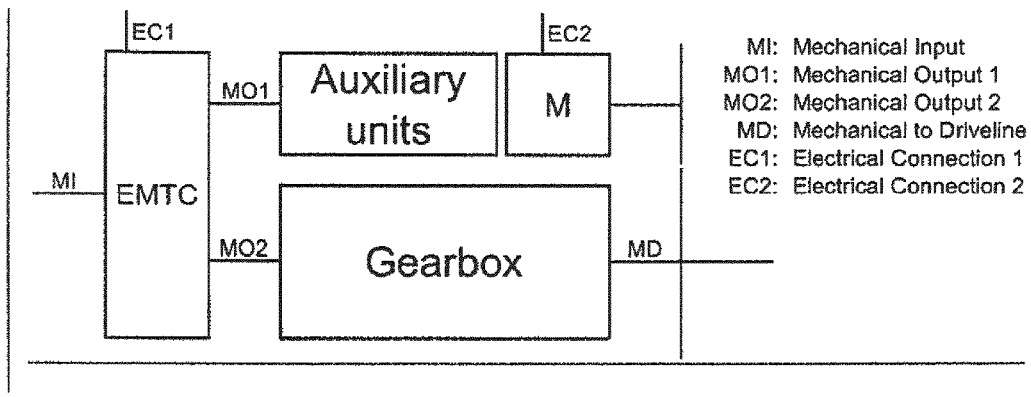
FIG. 7A and FIG. 7B relate to different embodiments in which the EMTC has a first EC1 and a second EC2, wherein EC2 is directly electrical coupled to the EMTC but is mechanically coupled with parts of the gearbox in between (=parts of the first output shaft). This mechanical coupling can be on the output shaft of the gearbox (FIG. 7A) or the input shaft of the gearbox (FIG. 7B).
Figure 7B:
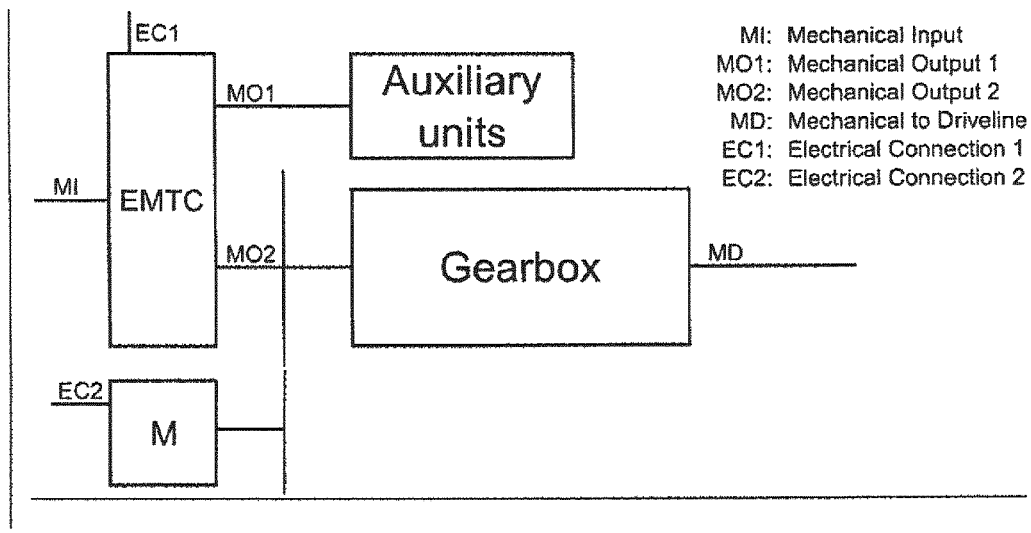

An embodiment provides that the EMTC is integrated with the gearbox of the transmission and comprises a DMPM with at least two mechanically or magnetically connected rotors, one electrical port that supplies the fixed stator, and a separate electrical machine with a second electrical connection linked to the electrical connection of the DMPM, and wherein this machine is mechanically connected to the output shaft of the EMTC or the gearbox output shaft; see, for instance, FIGS. 7A-B.

Figure 8A:
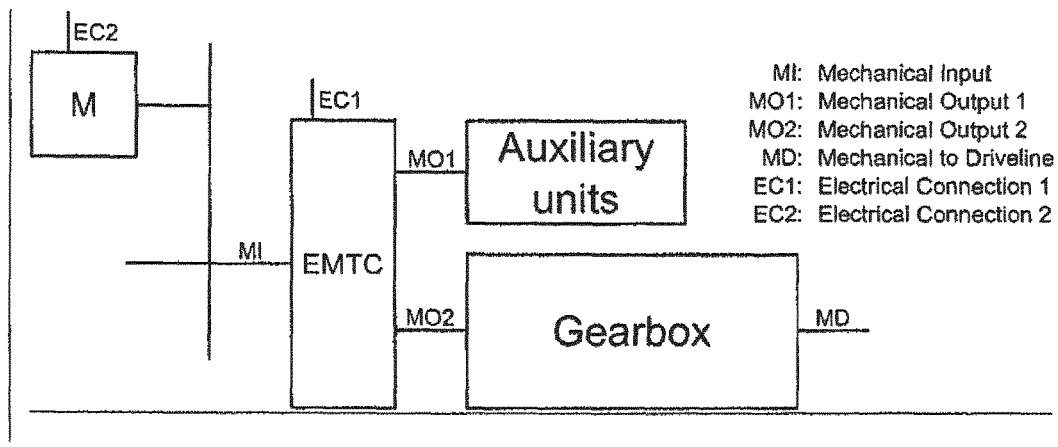
FIG. 8A and FIG. 8B are related to an embodiment in which the EMTC has a EC1 and wherein the EC2 is electrically coupled to EC1 but mechanically is coupled to the second output shaft at different locations. This mechanical coupling can be on the input shaft of the EMTC (FIG. 8A). or the shaft of the auxiliary units (FIG. 8B).
Figure 8B:
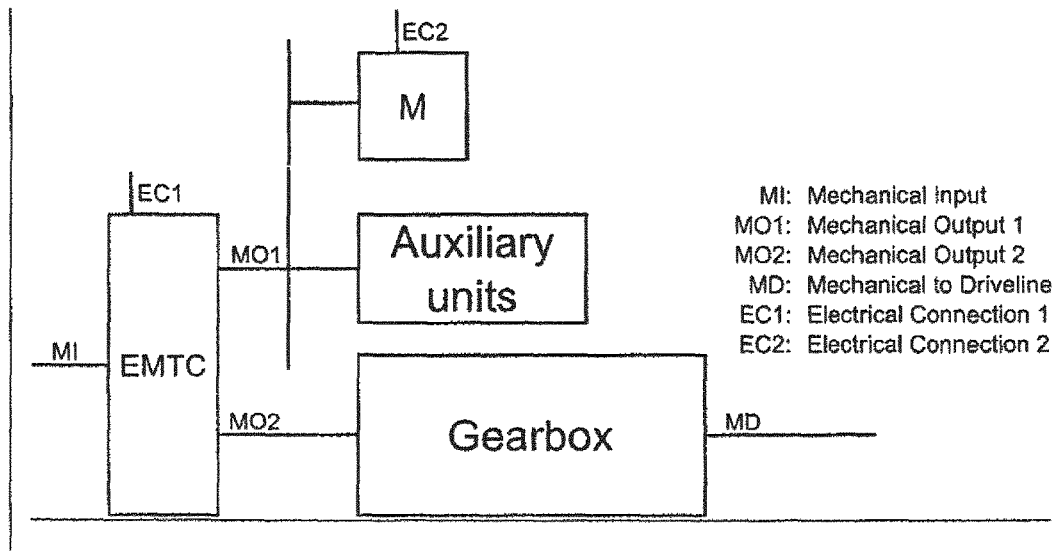

A further embodiment provides that the EMTC is integrated with the gearbox of the transmission and comprises a DMPM with at least two mechanically or magnetically connected rotors, one electrical port that supplies the fixed stator, and a separate electrical machine with a second electrical connection linked to the electrical connection of the DMPM, and wherein this machine is mechanically connected to the input shaft of the EMTC or auxiliary output shaft of the DMPM, and preferably being mechanically connected to the input shaft; see, for instance, FIGS. 8A-B.

The term "EMTC is integrated with the gearbox" means that both, preferably, have a common housing, wherein the gearbox has, preferably, at least three gearwheels.

Furthermore, FIGS. 5A, 5B, 7A, 7B, 8A, 8B have, as claimed in claim 1, two output paths (e.g., MO1 and MO2) on the output side and at least one mechanical input (MI) on the input side.

DESCRIPTION OF FURTHER DETAILS WITH REGARD TO THE FIGURES

By replacing the least efficient part of the hydrodynamic transmission, namely the hydraulic torque converter, with an electromagnetic power split device, the electromagnetic power split device offers a much higher efficiency while being able to be integrated with the rest of the transmission. The electromagnetic power split device offers similar advantages as the torque converter, such as torque multiplication and damping of vibrations. FIG. 1 schematically illustrates a driveline including the hydrodynamic transmission and a driveline including the electromagnetic power split device, the driveline including the electromagnetic power split device according to an embodiment of the invention.

An electromagnetic torque converter integrated with the transmission (either within or adjacent the transmission housing) is based on the concept of a dual mechanical port electrical machine (also known as an electrical variable transmission, a 4-quadrant transducer, or a mechanical and electrical two-port). The dual mechanical port electrical machine has two rotors (one on the input shaft and one on the output shaft) which are mechanically and/or magnetically coupled to transfer power at a speed ratio which is set by the electrical power flowing from the windings on the input rotor to a stator coupled on the output rotor via two inverters which are placed back-to-back. This electromagnetic power splitting thus transfers a part of the power via an extremely high-efficiency magnetic path (greater than about 98% efficiency) and a part of the power via a high-efficiency electrical path (greater than about 85% efficiency).

Replacing the hydraulic torque converter by an electromagnetic power split device based on a dual mechanical port electrical machine results in a highly efficient transmission with a continuously variable transmission ratio (CVT) that provides a functionality superior to that of the torque converter (by offering torque multiplication while damping vibrations) with the same level of integration with a stepped gearbox to form the transmission. Compared to a series electric solution (such as the DEE), efficiency may be increased while cost and installation space are reduced because only a portion of the power would be transferred electrically. The electromagnetic torque converter (EMTC) can be integrated with the gearbox in several ways which will be discussed hereinbelow.

Hydrodynamic transmissions are a very mature technology, and efficiency improvements thereto are typically based on modifications of the torque converter (such as lockup of an impeller and a turbine at high speed ratios).

Series-electric transmissions all typically share the same basic structure. In the series-electric transmission all mechanical power is transformed into electrical power by a generator and then transformed back into mechanical power by an electrical motor.

Dual mechanical port machines (DMPM) are found in technical literature and the prior art in which they are employed as a continuously variable transmission (CVT) in a variety of applications. However, the use of DMPMs has been limited to the complete replacement of the transmission (mechanical) by a DMPM (used as an electrical variable transmission) and on the hybridization that arises from fitting such an electrical vehicle transmission with an electrical storage means. The concept of using an electromagnetic torque converter (EMTC) integrated in a transmission, and pairing the EMTC with a stepped gearbox is unknown in the prior art.

Figure 2:
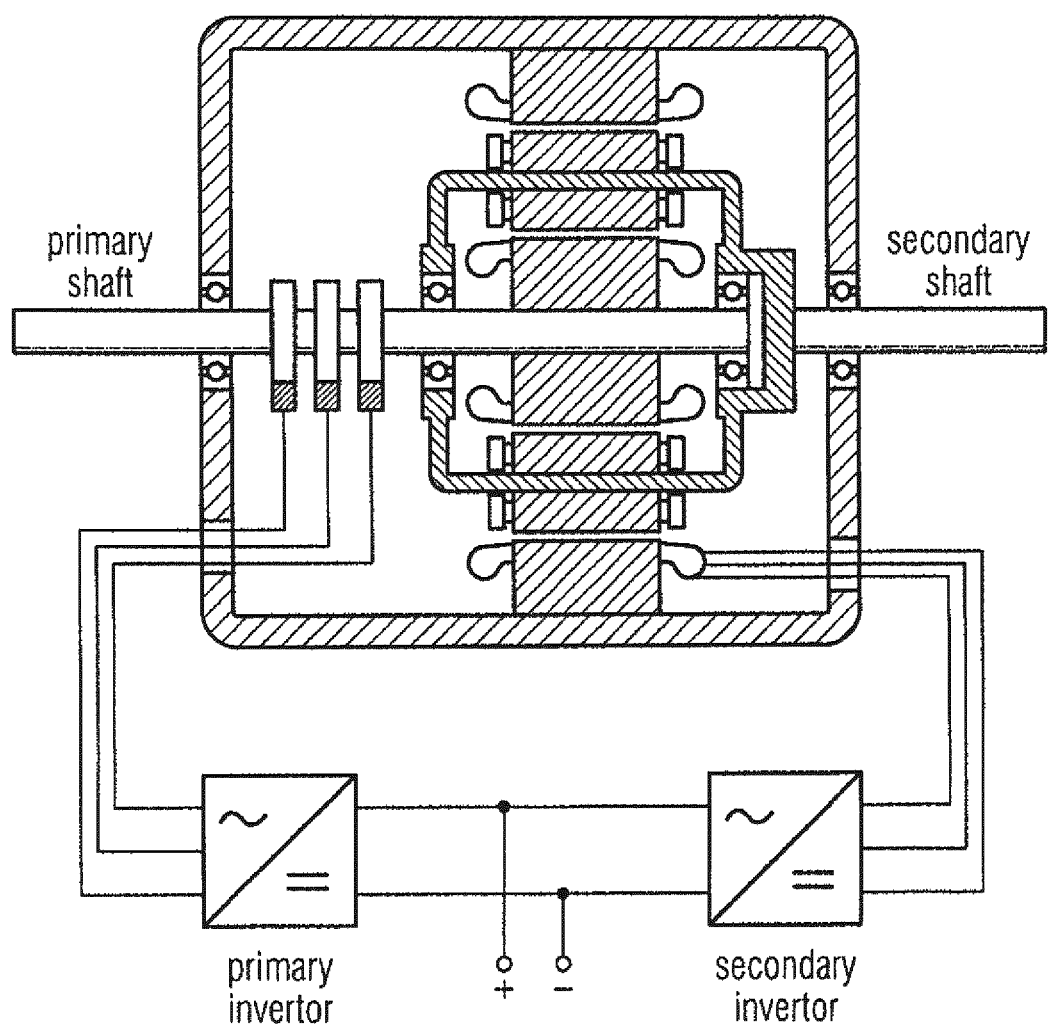
FIG. 2A-2D show different arrangements of the primary rotor/secondary rotor of EMTC alternatives.
Figure 2B:
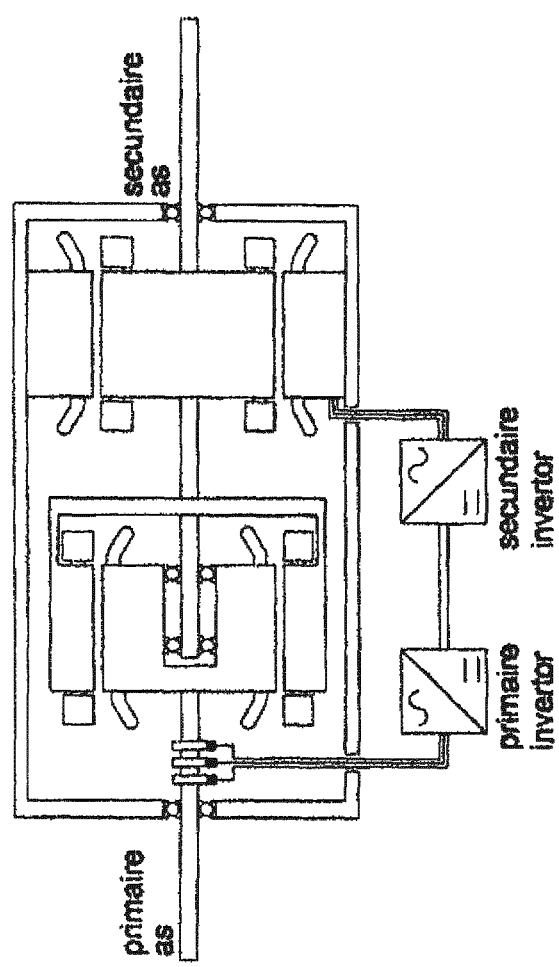

The layout of an exemplary DMPM is shown in FIG. 2A. It is understood that the DMPM may have alternate arrangements. The input or primary shaft is drivingly engaged with a rotor which is typically commutated by a primary inverter using a plurality of slip rings. The rotor creates a rotating field in the DMPM. Alternately, it is understood that the DMPM may employ a plurality of permanent magnets to create the rotating field. The field rotates a secondary rotor drivingly engaged with a secondary shaft at a fixed speed. By applying electrical power to a fixed stator however, the speed of the secondary shaft may be controlled. The electrical power that is extracted or added from the primary shaft is either added or extracted by the stator on the secondary shaft (except for losses inherent in the operation of the device).

Integral to the inventors' findings is also the variant (see FIG. 2B) where the primary and secondary rotor are magnetically coupled by a rotating stator on the primary rotor and where the rotating stator is mechanically coupled to the secondary rotor. Although the two rotors now are less mechanically integrated and because the primary rotor can not be magnetically coupled to the fixed stator, which may result in lower power density, cooling of the device and construction are simplified. The use of a DMPM configuration and the integration of the torque converter functionality with electrical machines integral in the transmission remains. All such variations are intended to be within the scope and spirit of the inventors' findings, as long as a dual mechanical port machine is used in one of the possible layouts.

Figure 2C:
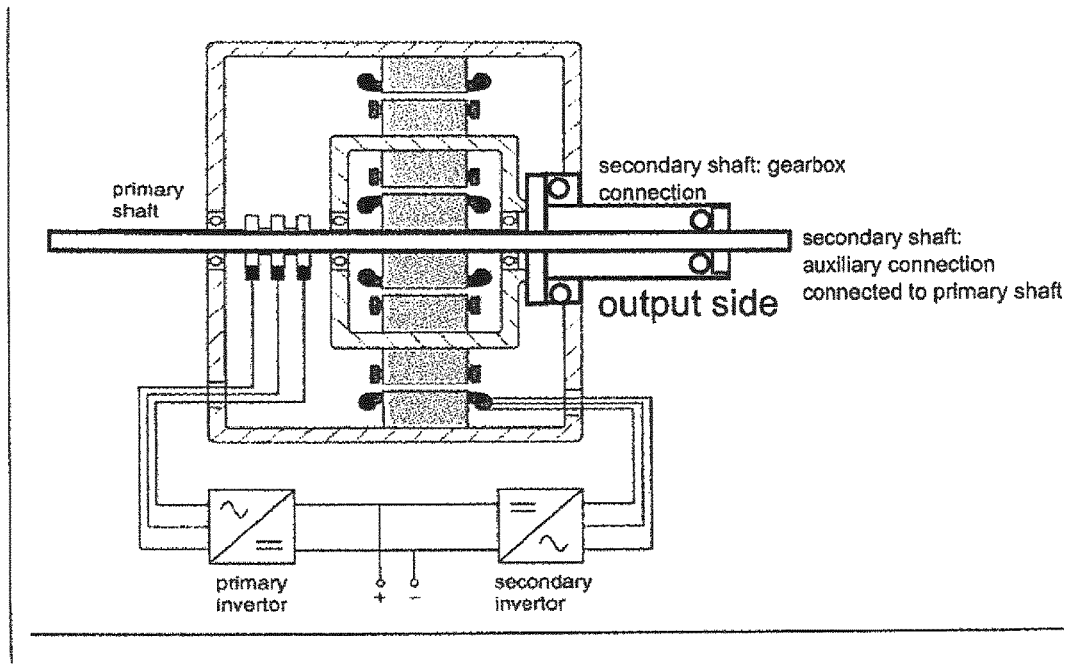

Integral to the inventors' findings are also the variants where on the secondary side of the machine a connection to the input side or primary shaft is provided. In FIG. 2C, an exemplary embodiment of such a variant is shown where the shaft of the secondary rotor is hollow and the primary shaft is extended within this secondary shaft.

Integral to the inventors' findings are also the variants where the DMPM only has one direct electrical port acting on the fixed stator and where the rotors on the primary and secondary shaft comprise of permanent magnets. In these variants the DMPM will be electrically connected to another machine providing electrical power to supply the stator. The main concept however remains the transfer of power via the plurality of (magnetically) coupled rotors.

The DMPM may have many variations in electromagnetic topology, which are shown in FIG. 3, and variations on the technology may also be used. As a non-limiting example, variations on the technology may include induction machines, synchronous machines, and switched reluctance machines.

In the prior art, a DMPM device has been conceptualized as a replacement for a transmission, and would thus need to be capable of delivering an entire spread of a conventional transmission. It is likely that a need for slip rings and the necessity for a large installed electrical power rating hinders acceptance of the concept.

Other known concentric rotor devices have been bulky and lack power electronic control. However, such devices do not employ the DMPM concept and fail to appropriate power splitting without power electronic control. The proposed control method employs rheostats, resulting in a poor efficiency.

In the prior art, none of the known devices consider drivingly engaging a DMPM device with a stepped automatic gearbox, nor do they consider the connection and integration of an auxiliary drive, a PTO drive, and a pump drive.

The purpose of the inventors' findings is to provide functionality that at least is equal to that of a hydrodynamic transmission with a hydraulic torque converter in terms of torsional vibration cancellation and a torque multiplication and that allows launch and operation to overdrive the transmission. The inventors' findings (circled in FIG. 4)

comprise, inter alia, an electric machine including two rotors (concentric rotors for a radial-radial type of topology). One of the rotors is drivingly engaged with an output shaft of the ICE and a remaining one of the rotors is drivingly engaged with an input shaft of a gearbox. The electric machine also includes power electronic converters in electrical communication with one of the rotors and the stator, a plurality of gears, and corresponding coupling devices for the gear sets.

An advantage of the inventors' findings is that due to the power splitting and the electromagnetic power transfer, a high efficiency of the device is achieved with a low installed electrical power rating. Another advantage of the inventors' findings is that the electrical machine components may be integrated within the transmission. Yet another advantage of the inventors' findings is the possibility to integrate the electromagnetic torque converter with the transmission in a manner so that no slip rings are required and the needed connections to hydraulic pumps are easily facilitated.

Figure 5A:
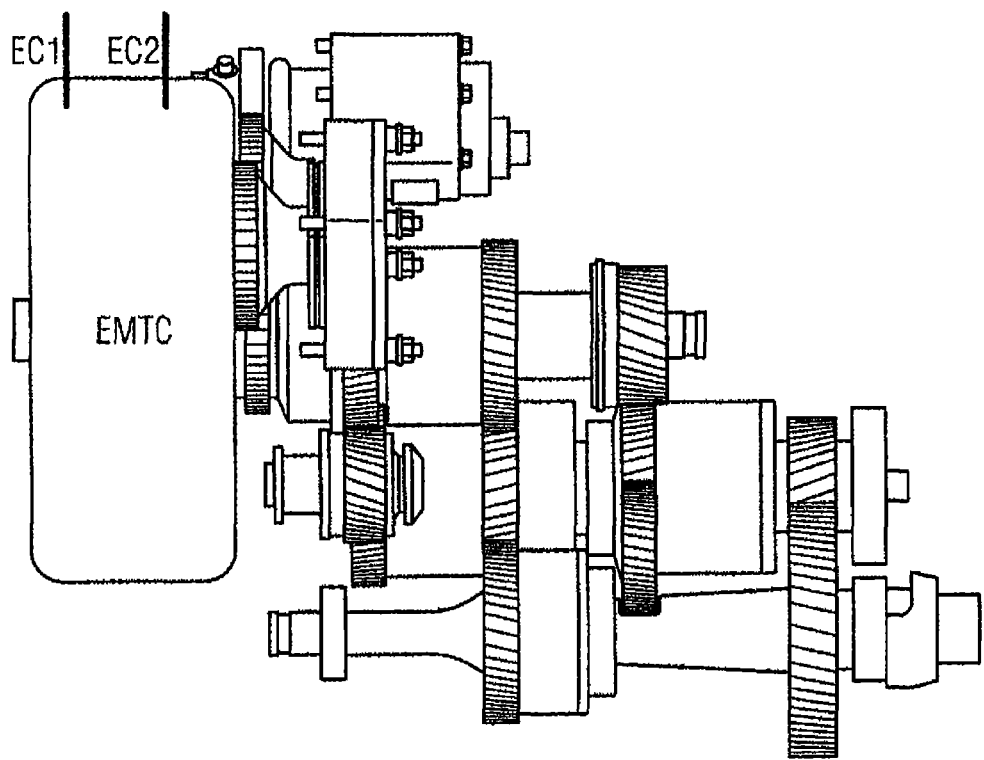
FIG. 5A and FIG. 5B relates to a first embodiment of the transmission according the inventors findings in which the EMTC has two connections, namely EC1 and EC2 that are respectively supplying the inner rotor and fixed stator of the EMTC.
Figure 5B:
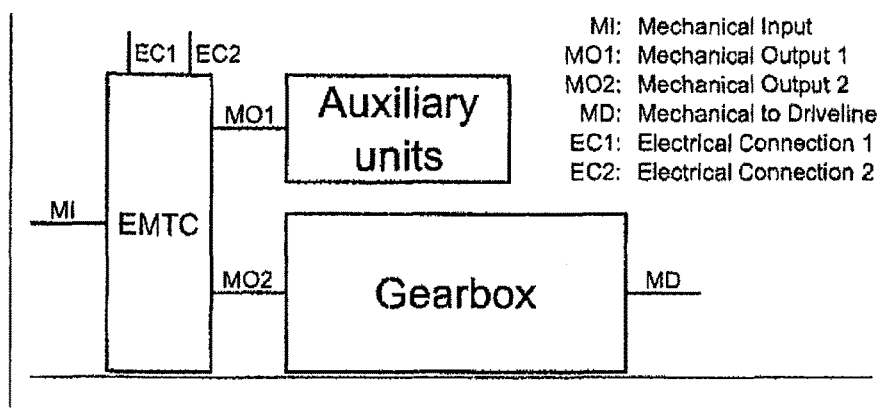

A first embodiment of the transmission including an electromagnetic torque converter (EMTC) is shown in FIG. 5A, 5B. The transmission including the EMTC comprises a DMPM in driving engagement with an output shaft (not shown) of an ICE (not shown) and an input shaft of a gearbox. A pair of power electronic converters (not shown) is in electrical connection with a pair of rotors of the EMTC. EC1 and EC2 are the electrical connections from a primary rotor and a stator, respectively. The EMTC is positioned similarly with respect to the transmission as a conventional hydraulic torque converter. The transmission including the EMTC can be achieved using one of a plurality of topologies and motor technologies, depending on the desired characteristics for a given application. In a preferred embodiment, a topology without slip rings (such as the topology shown in FIG. 4) is used.

Figure 6:
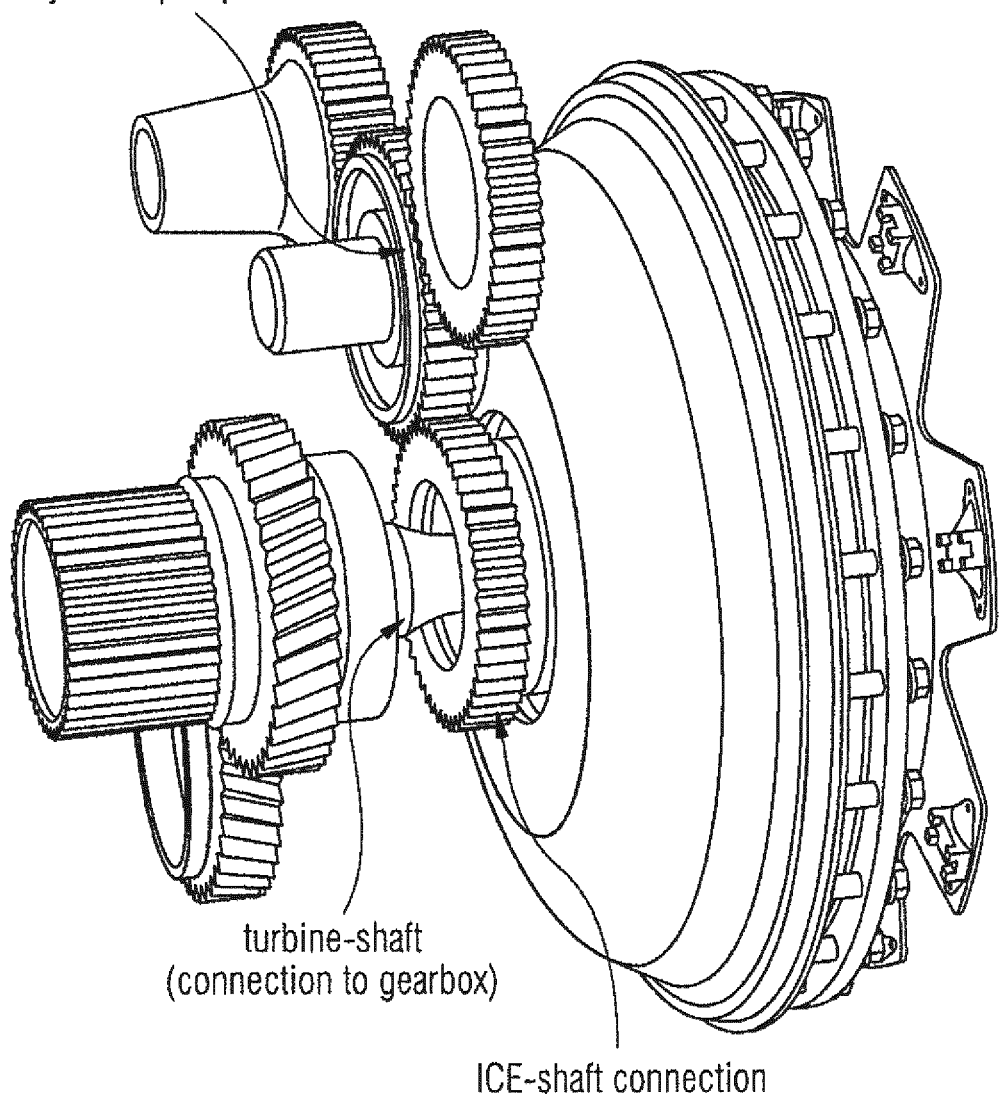
FIG. 6 relates to an arrangement in which two output shafts are arranged concentrically to each other.

Integral to the inventors' findings is a variant which provides also a connection to an input shaft on the gearbox-side as illustrated in FIG. 6. Specifically, this type of connection can be used in the gearbox to drive a PTO, a hydraulic pump, or another auxiliary device. The driving of such auxiliary devices may also be performed by the output shaft or the drive connection of such auxiliaries may be located directly on the input side.

A plurality of alternative layouts are possible by still integrating the DMPM in the transmission, but by moving a portion of the machine (typically an exciter portion) from the multiple-rotor structure to either the output shaft or the input shaft. Although this may lead to a lesser degree of integration in the torque converter part, and some embodiments may only be feasible with certain topologies or technologies, the integration of the torque converter functionality with electrical machines integral in the transmission remains. All such variations are intended to be within the scope and spirit of the inventors' findings, as long as a dual mechanical port machine is used.

Although some embodiments are shown to include certain features, it is understood that any feature disclosed herein may be used together or in combination with any other feature on any embodiment of the inventors' findings.

Figure 2D:
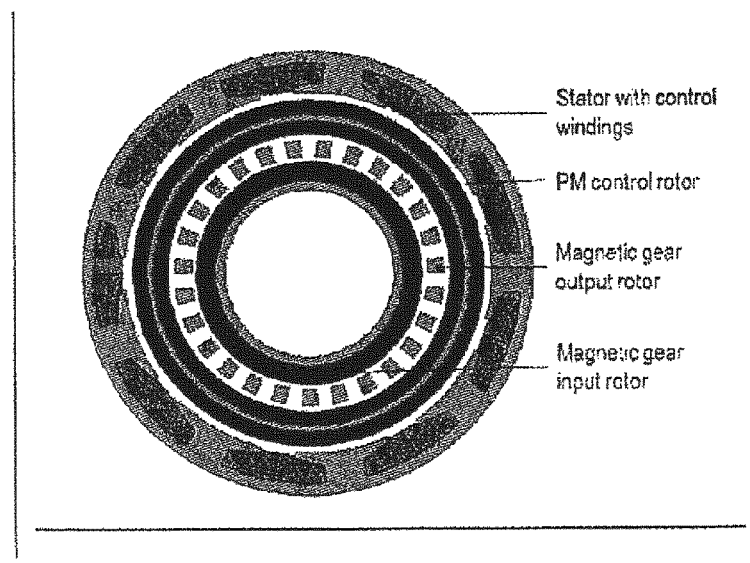

Two specific series of embodiments, typically utilizing a variant of the DMPM such as in FIG. 2D are illustrated in FIGS. 7A to 8B. In both FIGS. 7A, 7B, 8A, and 8B, the DMPM input (primary shaft) is annotated as MI, the secondary shafts are annotated as MO1 and MO2—where MO1 is the first secondary shaft which is mechanically connected to the input shaft MI and MO2 is the second secondary shaft which is only in magnetical connection with the input shaft, the output shaft of the gearbox is annotated as MD and the two electrical connections to the EMTC and additional machine are annotated as EC1 and EC2 respectively.

Embodiments where the exciter machine (stator 1 and inner rotor 1) or an additional secondary machine (M) is connected either directly or via gears to the output shaft of the gearbox or the secondary shaft of the DMPM are shown in FIGS. 7A and 7B respectively.

Figure 9A:
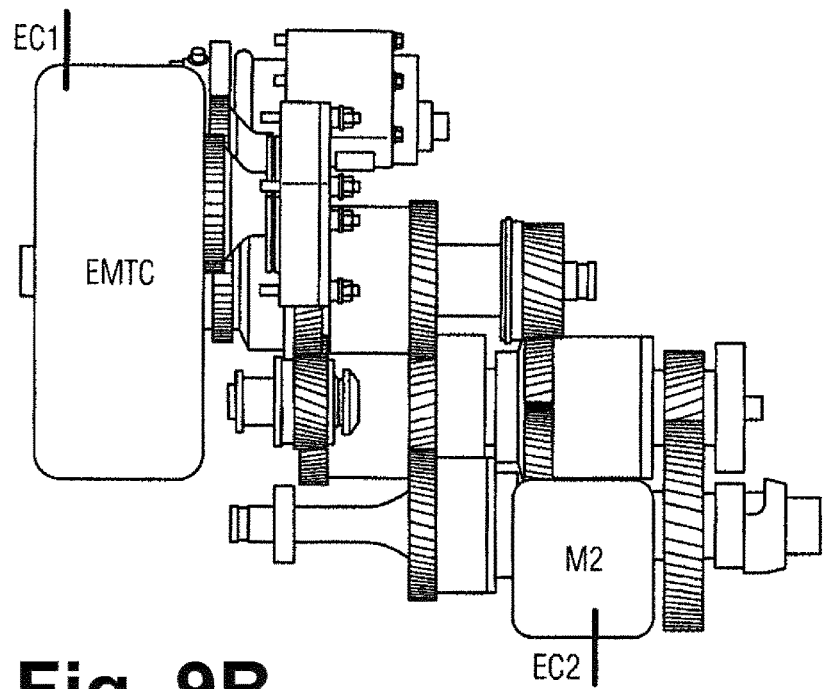
FIG. 9A, FIG. 9B and FIG. 9C are related to variants of FIG. 7A in where different physical positions are demonstrated.
Figure 9B:
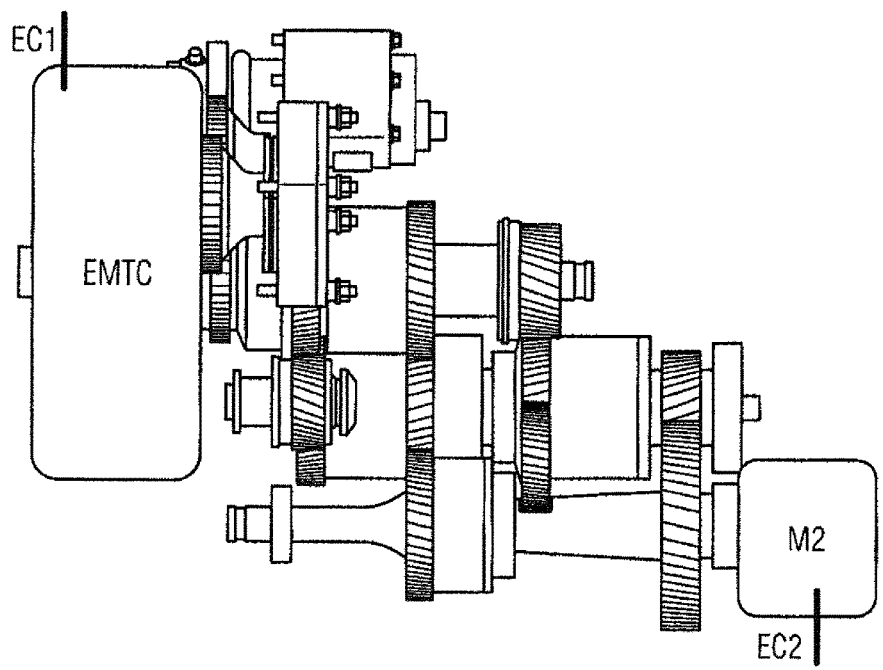
Figure 9C:
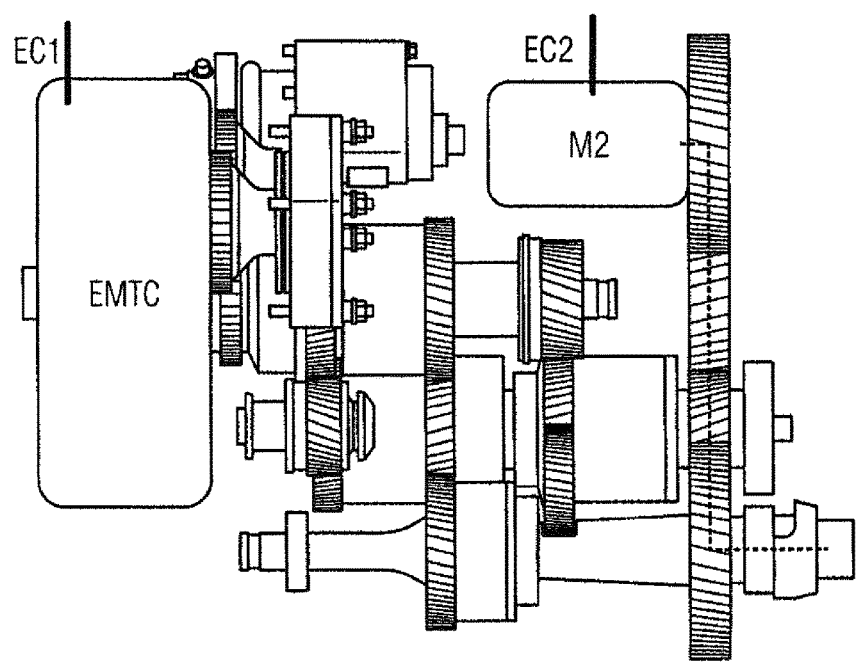

Embodiments where the additional secondary machine (M) is connected to the output shaft of the gearbox are shown in FIGS. 9A, 9B and 9C in more detail. FIG. 9A shows a variant where the machine is placed on the output shaft in between gearings. FIG. 9B shows a variant where the machine is placed on the output shaft after the final gear. FIG. 9C shows a variant where the machine is placed on the output shaft connected to the final gear by means of additional gearing.

Embodiments where the exciter machine (stator 1 and inner rotor 1) or an additional primary machine (M) is connected either directly or via gears to the input shaft of the transmission either directly or via the connection to the primary shaft on the output side of the DMPM are shown in FIGS. 8A and 8B respectively. This includes the connection of the additional machine (M) on the auxiliary power connection of the transmission.

Figure 10A:
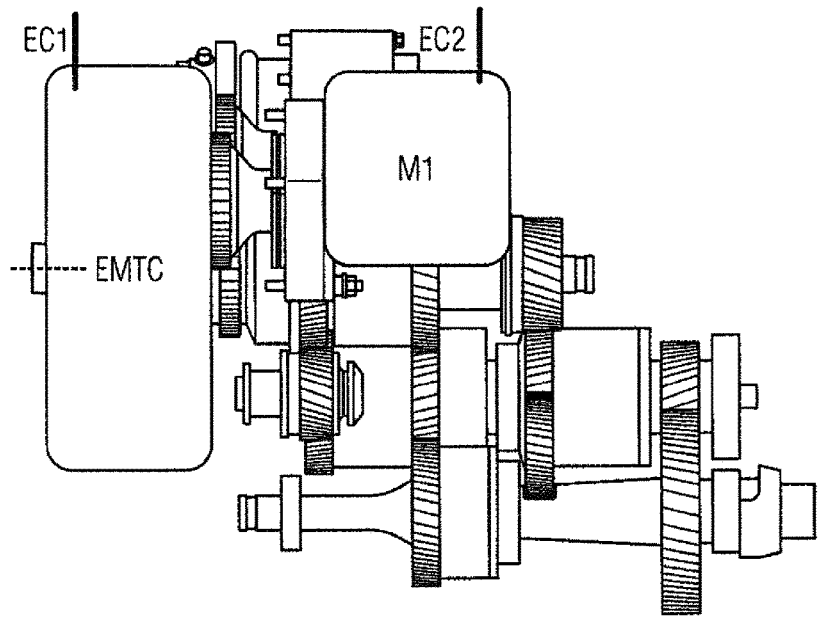
FIG. 10A and FIG. 10B are related to variants of FIG. 8B in where different physical positions are demonstrated.
Figure 10B:
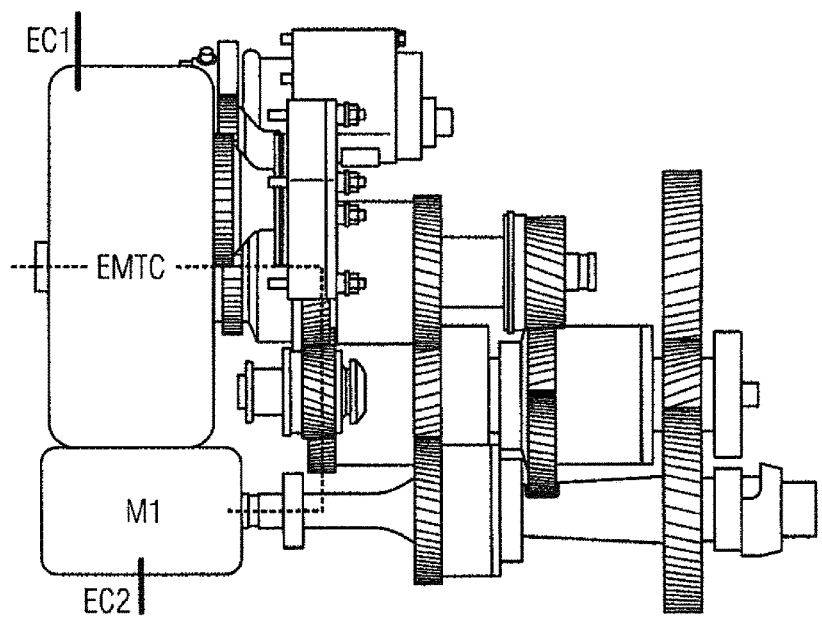

Embodiments where the additional secondary machine (M) is connected to the output side of the DMPM are shown in FIGS. 10A and 10B. FIG. 10A shows a variant where the machine is connected next to the auxiliary units. FIG. 10B shows a variant where the machine is placed below the EMTC and is connected to the output side of the EMTC by means of additional gearing.

In a direct drive mode, almost all power is transferred magnetically and near to zero power is transferred electrically. In this case the (electrical) speed of a primary side and a secondary side is equal. When deviating from this mode, a part of the power is transferred electrically by controlling a slip speed of the electrical fields. An electronic controller (for example, based on a microcontroller) is used to set the speeds of the fields and to control both power electronic converters to let the transmission and the prime mover (for example, an ICE) operate at their optimal points.

The power electronic converters on the primary machine and the secondary machine may also be connected to a means of electrical energy storage (such as, but not limited to a plurality of batteries, a plurality of supercapacitors, or an electromagnetic flywheel) to realize a hybrid drivetrain solution.

The power electronic converter of at least the primary machine or the secondary machine can be connected to a means of electrical energy storage (such as, but not limited to a plurality of batteries, a plurality of supercapacitors, or an electromagnetic flywheel) and/or an electrical network in the vehicle to feed electrical auxiliaries.

The power electronic converter of at least the primary or secondary machine can be connected to a means of electrical energy storage (such as, but not limited to a plurality of batteries, a plurality of supercapacitors, or an electromagnetic flywheel) and/or an electrical network in the vehicle to obtain a start/stop functionality of the transmission.

The DMPM can be designed as a torque converter which is integrated with the gearbox and the drive of auxiliaries to form the transmission. The least efficient portion of a conventional hydrodynamic transmission, the hydraulic torque converter, is replaced with an electromagnetic power split device which offers similar advantages as the torque converter (such as torque multiplication and damping of vibrations) with the same level of integration, but at a much higher efficiency.

Additional advantages of the DMPM as a torque converter are:
  A high efficiency over a wide operating range
  The electromagnetic power split, which offers a reduced power rating for power electronics and machine windings without the use of an epicyclic gearset
  An integrated design which is more compact and cost effective than the use of separate machines
  Torsional vibration cancellation All of the embodiments shown herein and described hereinabove, can be realized with or without slip rings.

All of the embodiments as shown herein and described hereinabove, can realize the connection of the PTO and/or an auxiliary hydraulic pump to the input shaft as in a conventional transmission, especially powershifting wet plate transmissions.

In the following, several embodiments of the EMTC arrangement according to the inventors' findings are shown. In view of the above, special reference is made to FIGS. 5A, 5B, 7A, 7B, 8A, 8B.

In all embodiments, a mechanical input (MI) is connected to the EMTC (left of the EMTC). In all embodiments, an electrical connection 1 (EC1) and an electrical connection 2 (EC2) are provided. In all embodiments, EC1 is directly connected to the EMTC (see upper side of the EMTC). The location of EC2 is different according to different embodiments (see FIGS. 5A-8B for details). All of the embodiments show an EMTC, a gearbox of the transmission, and auxiliary units. In all cases, the output of the gearbox is denoted as MD (mechanical driveline). Furthermore, in all embodiments the mechanical output 1 of the EMTC (MO1) is connected to the auxiliary units, wherein the mechanical output 2 (MO2) connects the EMTC and the gearbox, as shown in patent claim 1 and all of the dependent claims, for example. FIGS. 7A-8B show an additional primary machine (denoted as M) which is connected to the electrical connection 2.

Several alternative embodiments are shown in which the EMTC has a mechanical input connectable to a prime mover, such as an ICE, and at least two output paths, wherein at least the second output path (MO2) is connected/coupleable to a gear box and wherein the gearbox is finally connectable to a driven element (see MD, connectable to a differential, a drive shaft etc.).

In accordance with the provisions of the patent statutes, the inventors' findings have been described in what is considered to be exemplary embodiments. However, it should be noted that the invention can be practiced otherwise than as specifically illustrated and described without departing from its spirit or scope.

The invention claimed is:

1. A transmission for a vehicle, comprising:
  an input shaft configured for being coupled to a prime mover on an input side of the transmission,
  an electromagnetic torque converter comprising a dual mechanical port machine (DMPM) having a first rotor coupled to the input shaft, and a second rotor, the first rotor and the second rotor configured to be magnetically coupled to one another, and
  a gearbox arranged on an output side of the transmission and configured to be coupled to a driven element, and an auxiliary device;
  wherein the electromagnetic torque converter (EMTC) has at least a first output path including a first output shaft, wherein the first output shaft is drivingly engaged with the second rotor and coupled to the gearbox, and a second output path including a second output shaft, wherein the second output shaft is concentrically aligned with the first output shaft and wherein the second output shaft provides a connection to the input shaft, wherein this connection is arranged on the gearbox-side of the dual mechanical port machine and which is configured to drive the auxiliary device.

2. The transmission according to claim 1, wherein the prime mover is an internal combustion engine, an electric motor, and/or a turbine.

3. The transmission according to claim 1, wherein the driven element is a drive shaft, a differential, a transfer case, and/or a disconnect system of a vehicle driveline.

4. The transmission according to claim 1, wherein the gearbox is a stepped gearbox, a CVT, and/or a combination of a CVT with a stepped gearbox.

5. The transmission according to claim 1, wherein the auxiliary device is at least one of a PTO, a generator, a charge pump for the operation of the gearbox, a charge pump for the work hydraulics, a vehicle subsystem, and an external load.

6. The transmission according to claim 1, wherein rotors that are one of concentrically aligned and in line.

7. The transmission according to claim 1, wherein the transmission comprises an electronic controller to set the speeds on the input side and on the output side in order to achieve an optimal performance of the transmission preferably by providing at least one of operating an internal combustion engine at an optimal operating point and providing a maximal torque at the output side.

8. The transmission according to claim 1, wherein the EMTC is directly used as a generator for at least one of a vehicle subsystem and a load by providing a connection point between a first electrical connection and a second electrical connection.

9. The transmission according to claim 1, wherein the EMTC is coupled to an energy storage device on connection point between a first electrical connection and a second electrical connection.

10. The transmission according to claim 1, wherein the EMTC has one of a radial-radial flux arrangement, an axial-axial flux arrangement, and an axial/radial-radial flux arrangement.

11. The transmission according to claim 1, wherein the EMTC is a replacement for one of a hydraulic torque converter, a hydrostatic converter and a series electrical converter.

12. The transmission according to claim 1, wherein the EMTC is integrated with the gearbox of the transmission and the DMPM has two electrical ports that supply one of the rotors using slip rings or a rotating contactless transfer and a fixed stator.

13. The transmission according to claim 1, wherein the EMTC is integrated with the gearbox of the transmission and the DMPM has one electrical port that supplies a fixed stator and a separate electrical machine with a second electrical connection linked to the electrical connection of the DMPM and wherein the separate electrical machine is mechanically connected to an output shaft of the EMTC or an output shaft of the gearbox.

14. The transmission according to claim 1, wherein the EMTC is integrated with the gearbox of the transmission, wherein the DMPM comprises one electrical port that supplies a fixed stator and a separate electrical machine with a second electrical connection linked to the electrical connection of the DMPM, and wherein the separate electrical machine is mechanically connected to one of an input shaft of the EMTC and an auxiliary output shaft of the DMPM.

15. A vehicle driveline for a vehicle, comprising:
a transmission, comprising:
an input shaft configured for being coupled to a prime mover on an input side of the transmission,
an electromagnetic torque converter comprising a dual mechanical port machine (DMPM) having a first rotor coupled to the input shaft, and a second rotor, the first rotor and the second rotor configured to be magnetically coupled to one another, and
a gearbox arranged on an output side of the transmission and configured to be coupled to a driven element, and
an auxiliary device;
wherein the electromagnetic torque converter (EMTC) has at least a first output path including a first output shaft, wherein the first output shaft is drivingly engaged with the second rotor and coupled to the gearbox, and a second output path including a second output shaft, wherein the second output shaft is concentrically aligned with the first output shaft and wherein the second output shaft provides a connection to the input shaft, wherein this connection is arranged on the gearbox-side of the dual mechanical port machine and which is configured to drive the auxiliary device.

* * * * *